United States Patent [19]
Kaplan

[11] Patent Number: 6,058,430
[45] Date of Patent: May 2, 2000

[54] VERTICAL BLANKING INTERVAL ENCODING OF INTERNET ADDRESSES FOR INTEGRATED TELEVISION/INTERNET DEVICES

[76] Inventor: Kenneth B. Kaplan, 1965 S. 9th La., West Des Moines, Iowa 50265

[21] Appl. No.: 08/708,801

[22] Filed: Sep. 9, 1996

Related U.S. Application Data

[63] Continuation-in-part of application No. 08/636,738, Apr. 19, 1996, abandoned.

[51] Int. Cl.[7] .............................. G06F 13/38; G06F 15/17
[52] U.S. Cl. ........................ 709/245; 345/327; 709/219; 348/12
[58] Field of Search ........................ 395/200.09, 200.16, 395/823, 200.47, 200.48, 200.49, 200.75; 370/487; 348/12, 13, 17, 435, 468, 478; 345/327; 709/218, 235, 217, 219

[56] References Cited

U.S. PATENT DOCUMENTS

| | | | |
|---|---|---|---|
| 4,064,490 | 12/1977 | Nagel | 395/200.47 |
| 4,450,477 | 5/1984 | Lovett . | |
| 4,553,161 | 11/1985 | Citta . | |
| 4,554,579 | 11/1985 | Citta . | |
| 5,253,341 | 10/1993 | Rozmanith et al. | 395/200.49 |
| 5,321,750 | 6/1994 | Nadan . | |
| 5,410,326 | 4/1995 | Goldstein . | |
| 5,481,542 | 1/1996 | Logston et al. | 348/13 |
| 5,497,187 | 3/1996 | Banker et al. | 348/478 |
| 5,512,935 | 4/1996 | Majeti et al. | 348/12 |
| 5,530,852 | 6/1996 | Meske, Jr. et al. | 395/200.48 |
| 5,539,822 | 7/1996 | Lett | 348/12 |
| 5,544,320 | 8/1996 | Konrad | 395/200.49 |
| 5,694,163 | 12/1997 | Harrison | 348/13 |
| 5,701,451 | 12/1997 | Rogers et al. | 395/200.48 |
| 5,721,827 | 2/1998 | Logan et al. | 395/200.47 |
| 5,745,909 | 4/1998 | Perlman et al. | 345/327 |
| 5,761,606 | 6/1998 | Wolzien | 348/12 |
| 5,774,664 | 6/1998 | Hidary et al. | 395/200.48 |
| 5,778,181 | 7/1998 | Hidary et al. | 395/200.48 |
| 5,790,806 | 8/1998 | Koperda | 395/200.48 |

OTHER PUBLICATIONS

Heylighen, F.; "World–Wide Web: a distributed paradigm for global networking"; Proceeding. SHARE Europe Spring Conference; pp. 355–368, Apr. 18, 1994.

Katkere, A. et al.; "Interactive video on WWW: Beyond VCR–like interfaces"; Computer Networks and ISDN Systems, vol. 28, Issue 11; pp. 1559–1572, May 1996.

Laubach, M.; To foster residential area broadband internet technology: IP datagrams keep going, and going, and going @?; Computer Communications, vol. 19, Issue 11; pp. 867–875, Sep. 1996.

*Primary Examiner*—Mark H. Rinehart
*Attorney, Agent, or Firm*—Kent A. Herink; Daniel A. Rosenberg; Davis Brown Law Firm

[57] ABSTRACT

A television and Internet system combine a television receiver and an Internet access subsystem. The system includes a television with the usual subsystems including a tuner, color demodulator and R-G-B video amplifiers, deflection amplifiers and high and low voltage power supply, audio amplifier and on-screen display processor including a vertical blanking interval decoder. The system additionally includes a microprocessor which supports serial communications, RAM, Flash memory and ROM for storing the operating system, Internet communications protocol and Internet browser software, graphics display controller and network interface. The microprocessor decodes Internet addresses encoded and transmitted via the vertical blanking interval and provides direct access to the Internet through the television receiver.

10 Claims, 2 Drawing Sheets

VERTICAL BLANKING INTERVAL ENCODING OF INTERNET ADDRESSES FOR INTEGRATED TELEVISION/INTERNET DEVICES

CROSS REFERENCE TO RELATED APPLICATIONS (CLAIMING BENEFIT Under 35 U.S.C. 120)

This application is a continuation-in-part of U.S. application Ser. No. 08/636,738 filed Apr. 19, 1996. by K. Kaplan, now abandoned.

TECHNICAL FIELD

The present invention relates generally to television systems and the Internet, and particularly to a system which combines a television receiver with an Internet access system wherein an Internet address associated with the programming being transmitted is encoded and transmitted in the Vertical Blanking Interval.

BACKGROUND ART

The Internet and its World Wide Web ("WWW") system have become an important means of providing access for many users to vast amounts of information stored on the servers which make up the Internet. To date, the majority of users are people with technical or professional backgrounds who use expensive personal computers or work stations to access the Internet and the World Wide Web. In order to increase usage and acceptance of the Internet and the World Wide Web by the public, it is necessary to provide systems which are less expensive and easier to use than computers.

To some extent the difficulty issue has been addressed by the emergence of numerous on-line services such as Prodigy, Compuserve and America Online. These services include an Internet interface for their users. These interfaces provide a relatively user-friendly connection to the Internet and provide new users a chance to experience the Internet. However, as an Internet connection, the cost of this approach is expensive due to the relatively high connect charges associated with these on-line services. Numerous other services allow more direct connection to the Internet at a much more reasonable cost, but typically require the user to use more difficult and complicated interface and browser programs and also require the user to have a greater understanding of the Internet. Additionally, all of the above mentioned interfaces require a personal computer system, which can be expensive and difficult to use.

At the present time, there is no direct link between television broadcasting and the Internet. With increasing frequency, a television program or television commercial may refer textually to a Universal Resource Locator ("URL") Internet address, such as a World Wide Web site address, relating to the program, content of the program or commercial. The viewer must either memorize or write down the URL and use a computer at some later time to access the referenced Internet site.

Thus, there is a need for a television and Internet server system which allows for easier and more economical access to the Internet and which allows users to automatically access Internet sites pertaining to or relating to television programming and commercials.

DISCLOSURE OF THE INVENTION

The present invention relates generally to television systems and the Internet, and particularly to a system which combines a television receiver with an Internet access system wherein an Internet address associated with the programming being transmitted is encoded and transmitted in the Vertical Blanking Interval. The present invention incorporates an Internet access subsystem into a conventional television receiver. The invention uses an economical embedded microprocessor preprogrammed with Internet browser software. Most current television receivers already include a simple microprocessor which provides control and on-screen display ("OSD") of channel tuning, volume, and other user controls, often used in conjunction with a handheld wireless remote control. The Internet access, control and OSD functionality can be controlled by a separate microprocessor or be incorporated into the OSD microprocessor. In the dual processor implementation the two microprocessors are interconnected typically by a serial connection.

The microprocessor includes and is functionally connected to RAM, FLASH memory and/or ROM, a graphics display controller, and a network interface. The operating system, the Internet communications protocol and Internet browser software are stored in the FLASH memory and ROM. The graphics display controller interfaces with the R-G-B video amplifiers to put the Internet information and sites on the screen.

The network interface in the present invention allows the microprocessor to access the Internet network. In one embodiment, the interface comprises a modem. The modem is connected to a standard telephone line. The microprocessor is connected to the modem and is programmed with the necessary software and data to contact and connect to an Internet access server via the telephone line. In other embodiments, the access to the Internet could be through ISDN, cable, other types of modems or by connection to a computer with connective capabilities to the Internet.

The television portion of the present invention is essentially the same as the modern televisions sold today. Modem televisions include an electronic tuner; intermediate frequency, audio and video detectors, and sync separator; color demodulator and RGB video amplifiers; deflection amplifiers and high and low-voltage power supply; audio amplifier; and an on-screen display processor including vertical blanking interval ("VBI") decoder (bit slicer) and remote control input. The television also includes a means for receiving a television signal. Signals are received from such sources as an antenna, cable, interactive television sources and satellite dishes as well as video cassette recorders ("VCR's") and laser disc players.

The television signals in North America are received by televisions in the national television system committee ("NTSC") broadcast standard. The NTSC broadcast standard includes a vertical blanking interval which is not seen on the television screen. In addition to synchronizing the television signal image, information can be encoded into the VBI. One such use of encoding information is the use of the VBI to transmit closed captioning data. The present invention uses the VBI portion of the television signal to transmit information pertaining to Internet addresses. Internet addresses transmitted relate to the program, content of the program or commercial broadcasted on the incoming signal. Additionally, optional informational text relating to the Internet site, program, content of the program or commercial can be transmitted via the vertical blanking interval and can be displayed on the screen.

The microprocessor decodes the information in the VBI and determines if a valid Internet address has been received.

The user then has the option of immediately connecting to the Internet site identified by the address. The user can navigate the Internet using one or more of the remote control's navigation keys, an on-screen virtual keyboard and an optional full alphanumeric keyboard. The user may switch back to the program signal at any time. The user also can save the received Internet addresses without leaving the program signal. Additionally, channel information can be received by the present invention while connected to the Internet. This channel information can then be used to automatically change the channel upon the user exiting the Internet.

An object of the present invention is to provide a television and Internet system which provides users with economical, efficient and easy access to the Internet.

Another object of the present invention is to provide a television and Internet system which allows for Internet access via a television receiver.

Another object of the present invention is to provide a television and Internet system in which Internet addresses are encoded and transmitted via the Vertical Blanking Interval of the incoming programming signal.

Other objects, advantages, and novel features of the present invention will become apparent from the following detailed description of the invention when considered in conjunction with the accompanying drawings.

BEST MODES FOR CARRYING OUT THE INVENTION

Figure 1:
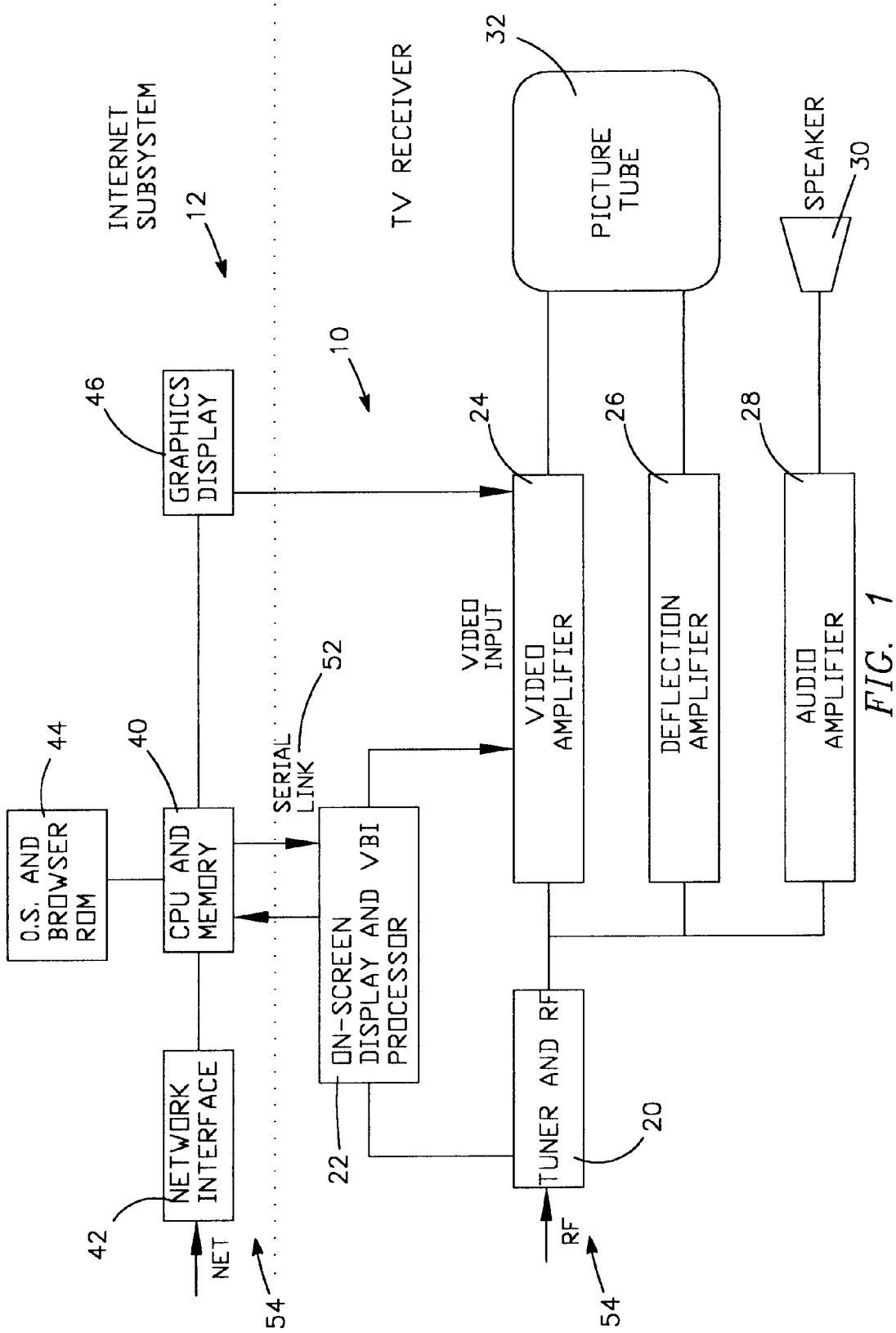
FIG. 1 is a block diagram of a television and Internet system built in accordance with the present invention.

To assist in a better understanding of the invention, a description of different forms and embodiments of the invention will now be described in detail. Reference will be made to the accompanying drawings. Reference numbers and letters will be used in the drawings to indicate specific parts and locations on the drawings. The same reference numerals and letters will be used throughout the drawings to indicate like or similar parts unless otherwise indicated. It is to be understood that the scope of the invention is not limited to the specific embodiments discussed herein.

Referring now to FIG. 1, a block diagram of a television receiver (10) and an Internet subsystem (12) built in accordance with the present invention is shown. The television (10) includes an electronic tuner (20), an on-screen display ("OSD") processor (22), a video amplifier (24), a deflection amplifier (26), an audio amplifier (28), a speaker (30), and a picture tube (32). The Internet subsystem (12) includes a processor (40), a network interface (42), static memory (44) and a graphics display controller (46).

In a preferred embodiment of the present invention, the processor (40) includes a 16 or 32 bit microprocessor and random access memory (RAM). The static memory (44) utilizes one or more of: read only memory (ROM), programmable read only memory (PROM), erasable programmable read only memory (EPROM) and electrically erasable programmable read only memory (EEPROM). The graphics display controller (46) includes the capabilities of generating 640 by 480 resolution or greater.

The television receiver (10) operates in a manner similar to modern televisions. The tuner (20) receives an incoming radio frequency ("RF") signal (50). The RF signal can originate from numerous external sources including an antenna, a cable, interactive television sources and satellite dishes as well as local sources including a video cassette recorder ("VCR") and a laser disc player. The tuner (20) is connected to the video amplifier (24) and the deflection amplifier (26). The tuner (20) sends the video portion of the incoming RF signal (50) to the video amplifier (24) and the deflection amplifier (26) which in turn projects the video image onto the picture tube (32).

The tuner (20) is also connected to the audio amplifier (28). The tuner (20) sends the audio portion of the incoming RF signal (50) to the audio amplifier (28) which amplifies the audio portion of the signal and sends it to the speaker.

The use of a picture tube television receiver is for best mode and demonstrative purposes only. Obviously, other screen types such as LCD and projection could be used within the scope of the present invention. Similarly, the speaker could be any audio output device such as a single speaker, multiple speakers or jacks which enable connection to external speakers or a separate audio system.

The incoming RF signal (50) is formatted in the national television system committee ("NTSC") broadcast standard or some other international standard. The NTSC broadcast standard is used throughout North America. The NTSC broadcast standard includes a vertical blanking interval ("VBI") which comprises the first 21 horizontal scan lines of each television picture field. These scan lines are not visible on the screen. The first nine scan lines must be black for proper vertical synchronization of the picture. Scan line 21 has been reserved for digital coding of closed captioning text. Scan lines 10 through 20 typically are not defined and are available to carry other information. Other international broadcasting standards such as PAL and SECAM have essentially identical capabilities. Using scan lines 10 through 20 of the VBI, or some portion thereof, the present invention allows the digital embedding of URL Internet addresses and related information in an RF signal and the automatic transfer of the URL Internet addresses and related information to the television receiver.

The OSD processor (22) is a microprocessor which provides control and on-screen display of channel tuning, volume, and other user controls, often used in conjunction with a hand-held wireless remote. Numerous user controls are provided in many modern television receivers. Many of these user controls are menu driven and include features such as audio controls, video controls, picture-in-picture, clock, parental lock-out of channel, favorite channel list, language and closed captioning. The OSD processor (22) interfaces with the video amplifier (24) to overlay the functions over the video image projected to the picture tube.

The OSD processor (22) is also connected to the tuner (20) such that it can receive the VBI portion of the incoming RF signal (50). The OSD processor (22) decodes the information embedded in the VBI. In all modern televisions, this includes the closed captioning information in scan line 21. In the present invention, the OSD processor (22) will also decode embedded URL Internet addresses and related information embedded in one or more of the scan lines 10 through 20.

When the OSD processor (22) decodes a URL Internet addresses, it transmits the address to the processor (40) of the Internet subsystem (12). The connection between the OSD processor (22) and the processor (40) is made by a serial link (52). The processor (40) checks to see if the received address is in a valid URL Internet address format.

If it is, the processor (40) instructs the graphic display controller (46) to signal that a valid URL Internet address had been received. The graphic display controller (46) is also interfaced with the video amplifier such that its graphics can be overlaid on the video image projected to the picture tube. The graphic display controller (46) can place an information symbol, icon or text message on the screen indicating that the processor (40) has received an Internet address. In another embodiment of the present invention, external lights such as light emitting diodes (LED's) can be used to signal the user that a valid URL has been received. These LED's most typically will be incorporated into the housing of the television.

At this point, the user or viewer has several options. These options will be discussed in greater detail below. One of the options is for the viewer to request that the Internet subsystem (12) make a connection with the URL Internet address. In a preferred embodiment of the present invention, this request is made by pressing an activation key on the remote control (not shown). The OSD processor (22) would receive this request and pass it on to the processor (40). The processor (40) would then begin the connection process to the URL Internet address. At the same time, the processor (40) can instruct the graphics display controller (46) to display a connecting symbol or message on the picture tube (32) or screen. Again, in an alternate embodiment of the present invention, external lights such as light emitting diodes (LED's) can be used to signal the user. These LED's most typically will be incorporated into the housing of the television.

The processor (40) is connected to read only memory (ROM) (44). The read only memory is used to store the operating system, the Internet connection software, and the Internet browser software used by the processor (40). The processor (40) is also connected to a network interface (42). The network interface (42) allows connection to the Internet (54).

In a preferred embodiment, the network interface (42) is a high speed modem with a connection baud rate of at least 28,800 and preferably 57,600 or greater. The connection to the Internet (54) is via a telephone line which plugs into the network interface (42).

The processor (40) continues the connection process requested by the viewer by attempting to access the Internet via the network interface (42). When communication has been established with the Internet, the processor (40) uses the Internet browser software and attempts to contact the Internet site using the URL Internet address.

During the connection process, the viewer may continue watching the television program or commercial provided by the incoming RF signal (50). When the connection process is complete, the processor (40) instructs the graphics display controller (46) to infirm the viewer. Again, the information can be displayed in icon or text form or can be displayed using one or more external LED indicators. The graphics display controller (46) will inform the viewer if the connection was unsuccessful as well as when the connection has been established. The viewer can then request that the Internet site be shown on the picture tube (32).

If the viewer requests to view the Internet site, the graphics display controller (46) overrides the tuner and provides the entire video component shown on the screen (32). In another embodiment of the present invention, the viewer can select a picture-in-picture option wherein the original program is shown in a size and position-adjustable view box on the screen. In another embodiment, the audio component of the original program can continue to play while the view "navigates" the Internet.

Once the graphics display controller (46) takes over and provides the entire video component shown on the screen (32), the picture tube functions essentially as a computer screen. The viewer navigates through the selected Internet site as well as the entire Internet using the remote control's navigation keys, an on-screen virtual keyboard, or an optional full alphanumeric keyboard. The optional full alphanumeric keyboard could either be hard wired to the television and the processor (40) via a serial connection or it could be by infrared and received in a similar fashion as the normal remote control. The information received via the infrared remote or keyboard is received and processed by the OSD processor (22) and passed on to the processor 40) via the serial link (52).

When the viewer has finished navigating the Internet, she can request that the program be returned to the screen (32). This request can include a request to terminate the Internet connection or a request not to terminate the connection.

In another embodiment of the present invention, information pertaining to specific channel programming can be acquired while navigating the Internet. This programming information can be transmitted back to the television receiver of the present invention. The programming information can include specific channel selection information. The transmitted channel information can then be passed on to the OSD processor which can change the specific channel. In one application, the channel information can be a one time channel change such as when a viewer is browsing a particular WWW site which references a current television program. In this application, the user might select from the WWW page the option of watching the program. The Internet site would transmit the channel information to the television receiver which would automatically change to that channel upon exiting the Internet.

In another application, the Internet site can continually transmit ongoing channel selection information whereby channel selection is controlled by the Internet site to which the television receiver is connected. In this application, the Internet site serves as an automatic channel browser wherein the television receiver automatically switches to the channels suggested by the Internet site. In this application the user will select an Internet site which matches the users viewing preferences. For example, a current news Internet site might be used to automatically switch the viewer's television receiver to channels which are covering breaking news stories. Another Internet site might direct the television receiver to various sporting events automatically switching to the channel on which the most action is occurring. Many controlled channel surfing scenarios could be implemented in this manner.

Figure 2:
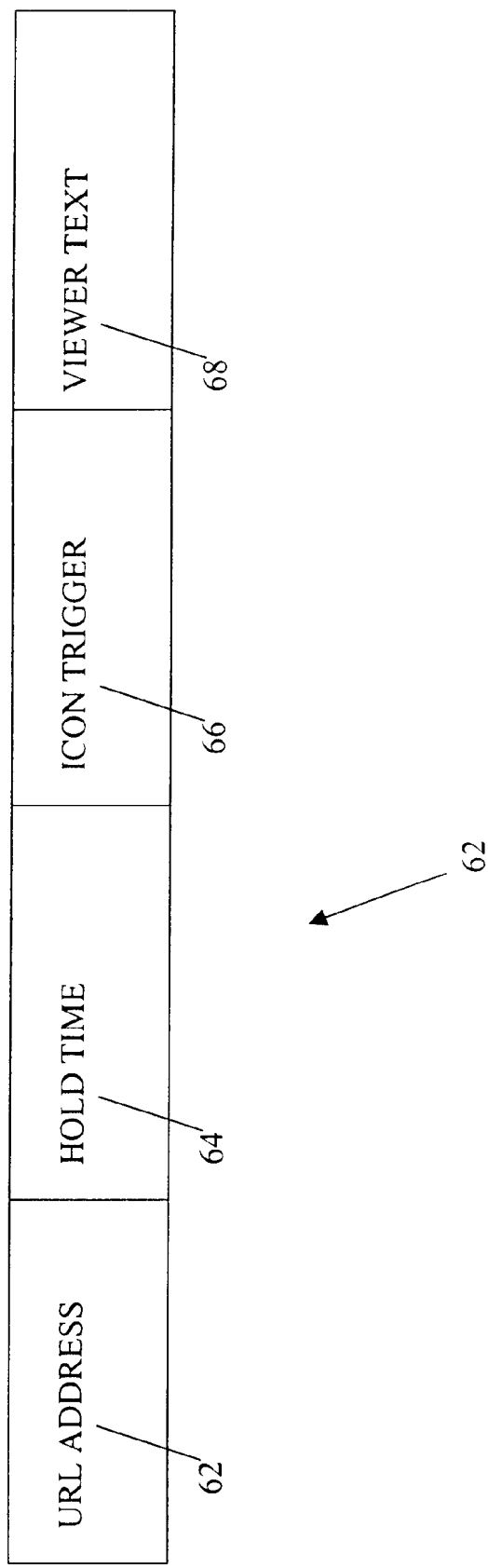
FIG. 2 is a block diagram of the information block which is encoded and transmitted via the vertical blanking interval.

Referring now to FIG. 2, a block diagram of the information block (60) which is encoded and transmitted via the vertical blanking interval (VBI) is shown. The data block (60) is encoded as ASCII text. The first field (62) of the block contains the Internet Universal Resource Locator (URL) address. The URL could reference a WWW site, an FTP, a Gopher site, or any other valid URL format. The second field (64) contains a hold time. The hold time indicates the number of seconds the graphics display controller should display the icon, symbol or message on the screen. The third field (66) of the block (60) contains an icon trigger. This field indicates exactly when the icon, symbol or message should be displayed. The fourth field (68) of the block (60) is an optional informational text field and is used to provide a descriptional, informational or promotional message to the viewer about the Internet site associated with the broadcast.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

I claim:

1. A television receiver and interconnected global information network system, comprising:

an incoming RF signal comprising a video component including a vertical blanking interval, an audio component, and a universal resource locator embedded in said vertical blanking interval that identifies content on the global information network system;

a tuner for receiving said incoming RF signal;

a picture tube;

a video amplifier and a deflection amplifier for receiving and amplifying the video component of the incoming RF signal from said tuner and for projecting said video component on said picture tube;

a speaker;

an audio amplifier for receiving and amplifying the audio component of the incoming RF signal from said tuner and for transmitting said audio component on said speaker;

a video signal display processor operably connected to said tuner and operably connected to said video amplifier for generating graphic images and overlying said graphic images over said video component of said incoming RF signal, and wherein said video display processor decodes said universal resource locator from within said vertical blanking interval;

an interconnected global information network processor operably connected to said video signal display processor, such that said processor receives said decoded universal resource locator;

a read-only memory operably connected to said interconnected global information network processor, such that said interconnected global information network processor can execute according to control programs stored within said read-only memory;

a network interface operably connected to said interconnected global information network processor for facilitating connection to the interconnected global information network based on said universal resource locator; and a graphics display controller operably connected to said interconnected global information network processor and operably connected to said video amplifier for generating on-screen graphics and overlying said on-screen graphics over said video component, wherein said graphics display interconnected global information network content based on said universal resource locator.

2. A method for integrating a television receiver and an interconnected global information network system, comprising:

providing an incoming RF signal comprising a video component including a vertical blanking interval, an audio component, and a universal resource locator embedded in said vertical blanking interval that identifies content on the global information network system;

providing a tuner for receiving said incoming RF signal;

providing a picture tube;

providing a video amplifier and a deflection amplifier for receiving and amplifying the video component of the incoming RF signal from said tuner and for projecting said video component on said picture tube;

providing a speaker;

providing an audio amplifier for receiving and amplifying the audio component of the incoming RF signal from said tuner and for transmitting said audio component on said speaker;

providing a video signal display processor operably connected to said tuner and operably connected to said video amplifier for generating graphic images and overlying said graphic images over said video component of said incoming RF signal;

providing an interconnected global information network processor operably connected to said video signal display processor;

providing a read-only memory operably connected to said interconnected global information network processor, such that said interconnected global information network processor can execute according to control programs stored within said read-only memory;

providing a network interface operably connected to said interconnected global information network processor; and providing a graphics display controller operably connected to said interconnected global information network processor and operably connected to said video amplifier for generating on-screen graphics and overlying said on-screen graphics over said video component, wherein said graphics displays content from the interconnected global information network based on said universal resource locator, receiving and decoding in said video signal display processor said universal resource loctator from within said vertical blanking interval of said incoming RF signal;

receiving said decoded universal resource locator in said interconnected global computer information network processor;

establishing a connection between the interconnected global computer information network and said interconnected global computer information network processor through said network interface, based on said universal resource locator; and interfacing information from the interconnected global computer information network with the television receiver through said graphics display controller, wherein said graphics display controller displays content from the interconnected global information network based on said universal resource locator.

3. The invention in accordance with claim 2 wherein information from the interconnected global information network is content correlated with the content of said video and audio component of said incoming RF signal.

4. The invention in accordance with claim 2 wherein said information from the interconnected global information network controls the channel selection of the television receiver.

5. The invention in accordance with claim 2 wherein information from the interconnected global information network interfaces with all channels of the television receiver.

6. The invention in accordance with claim 2 wherein said software includes software for browsing the interconnected global information network.

7. The invention in accordance with claim 2 wherein an information block is embedded in said vertical blanking interval of said incoming RF signal.

8. The invention in accordance with claim 7 wherein said information block comprises a plurality of fields.

9. The invention in accordance with claim 8 wherein said information block comprises a field for said universal resource locator.

10. The invention in accordance with claim 8 further comprising the step of controlling the timing of interfacing information from the interconnected global computer information network with the television receiver through the graphics display controller, wherein timing fields within said information block control said timing.

* * * * *